United States Patent

[11] 3,585,620

| [72] | Inventors | Michel Durand<br>Isere;<br>Jacques Pages, Rhone; Constantin Trofimoff, Isere, France |
|---|---|---|
| [21] | Appl. No. | 721,480 |
| [22] | Filed | Apr. 15, 1968 |
| [45] | Patented | June 15, 1971 |
| [73] | Assignee | Rhone-Poulenc S.A.<br>Paris, France |
| [32] | Priority | Apr. 19, 1967 |
| [33] | | France |
| [31] | | 103,371 |

[54] SIGNALLING AND CONTROL SYSTEM
10 Claims, 8 Drawing Figs.

[52] U.S. Cl. .................................................. 340/222,
340/213.2
[51] Int. Cl. ...................................................... G08b 19/00

[50] Field of Search .......................................... 340/213.2,
213, 213.1, 412, 147, 213 Q, 222

[56] References Cited
UNITED STATES PATENTS

| 2,701,872 | 2/1955 | Marmorstone ............... | 340/213.2 |
| 3,099,826 | 7/1963 | Noreen et al. ............... | 340/213.2 |

Primary Examiner—John W. Caldwell
Assistant Examiner—David L. Trafton
Attorney—Cushman, Darby and Cushman ABSTRACT: A method of controlling the signalling of faults in a system to be supervised and of controlling a followup action which includes the use of units chosen from a group of which a first type performs common signal control functions, a second type performs the functions of signal control which are peculiar to a fault, a third type performs a followup control and a fourth type provides signal repetition.

SIGNALLING AND CONTROL SYSTEM

The present invention relates to a system for controlling the signalling of faults in a system to be supervised and for controlling subsequent followup actions, and to the units employed for carrying out these methods.

It is known to perform elementary operations affecting the control of the signalling of faults in a system to be supervised and the control of the corresponding followup actions. More precisely, an annunciator system is know, in which, in the event of a fault, i.e. when a parameter of a system to be supervised exceeds a set limit, to signal this fault, which may be done by means of continuous or interrupted acoustic signals, or by means of luminous signals which operate continuously or flash intermittently, and to confirm receipt of these signals, this last operation being known as the "acknowledgement." It is also known to employ memory devices by means of which it is possible to locate the cause of a transistory fault or the first fault responsible for a series of faults after it has cleared. It is also known to provide followup systems by means of which normal service may be momentarily or permanently established after the acknowledgement of the fault signal, even if the fault persists, or to authorize this return to normal service only after the fault has disappeared, either automatically or only after the followup system has been reset.

Continuous problems of considerable complexity are encountered in industry in regard to the control of multiple followup systems which may be associated in cascade or in networks of unequal size and connected with the existence of faults which may be of differing nature and importance. It is at present known to satisfy most of these requirements, but this in only done by means of intricate research leading to complex schemes and apparatus which are specific to each problem and which it is thereafter difficult to modify in accordance with changing requirements.

It has now been found that the various electromechanical or electronic components, for example relays, switches, selectors, lamp flashing devices, may be reduced to a small number of different types and that these components may, with advantage, be combined in a simple manner to form units of reduced overall dimensions which are mechanically interchangeable. It has been found that such units may each perform a number of different functions without disadvantage. A number of different types of such units may be defined in accordance with the functions performed. Now, it has been found that a very small number of different types of units may with advantage be employed to resolve the problems of signalling faults with subsequent followup control. Finally, it has been found that if a number of units of different types are connected together, both elementary operations and complex sequences of fault signalling or followup control can be equally well performed.

The present invention is therefore concerned with a simple method which may be adapted to the rapid resolution of problems, from the simplest to the most complex, regarding the signalling of faults and the followup control, and with units which may be used for carrying out this method.

According to one aspect of the present invention there is provided a method of controlling the signalling of faults in a system to be supervised and of controlling a followup action in which there are connected together units, the number of which is chosen, in accordance with the diversity of the conditions to be satisfied, from a group of units having between two to four different types of units, each unit having electromechanical or electronic components, of which group of units a first type performs common signal control functions, a second type performs the function of signal control which are peculiar to a fault, a third type performs a followup control and a fourth type provides signal repetition.

According to another aspect of the present invention there is provided a signalling and followup control unit, which includes a casing closed by a cover which is secured in position by pressure, and which has on its rear face two quick-acting securing pins and a 16-contact connection strip, and, in the interior, electromechanical members which are accessible from the front face.

There has been provided a method of controlling the signalling of faults in a system to be supervised and of controlling the followup actions, which consists in connecting together, in accordance with the diversity of the conditions to be satisfied, from two to four different types of units which are mechanically interchangeable, and which are provided with electromechanical or electronic components. The first type of the units performs the signalling control functions common to the system, the second type of the units performs the signalling control functions peculiar to a fault, the third type of the units controls the followup action, and the fourth type performs a signal repetition. The units performing the aforesaid functions also form part of the invention.

Embodiments of the invention will now be described with reference to the accompanying drawings, which are given by way of example without limiting the invention, and include representations of the four types of unit which may be employed and in which.

In FIGS. 1 to 4, the component elements of the units are shown inside a dash-dotted rectangle, and there are provided terminals and connections for connecting the said component elements either to apparatus or to lines. The units are provided with relays, each of which comprises five sets of contacts, but in order not to overload the diagrams only the contacts actually used are shown.

The circuits include a number of low voltage electric lines of which $v_1$, and $v_2$ are the supply lines for the relays, $a$ is a line for acknowledging the receipt of signals, $b$ is a control line of a unit for signalling a control function common to the system, which in a particular embodiment is an acoustic warning device and $c$ is a line connected to control buttons of the simple turn or turn and push type.

The circuits also include a number of very low-voltage electric lines of which $l_1$ and $l_2$ are the supply lines for the signalling lamps, $d$ is the interrupted line for the signalling lamps, $e$ is the test line for the signalling lamps and $f$ is the line for signalling the failure of one or a number of units.

Figure 1:
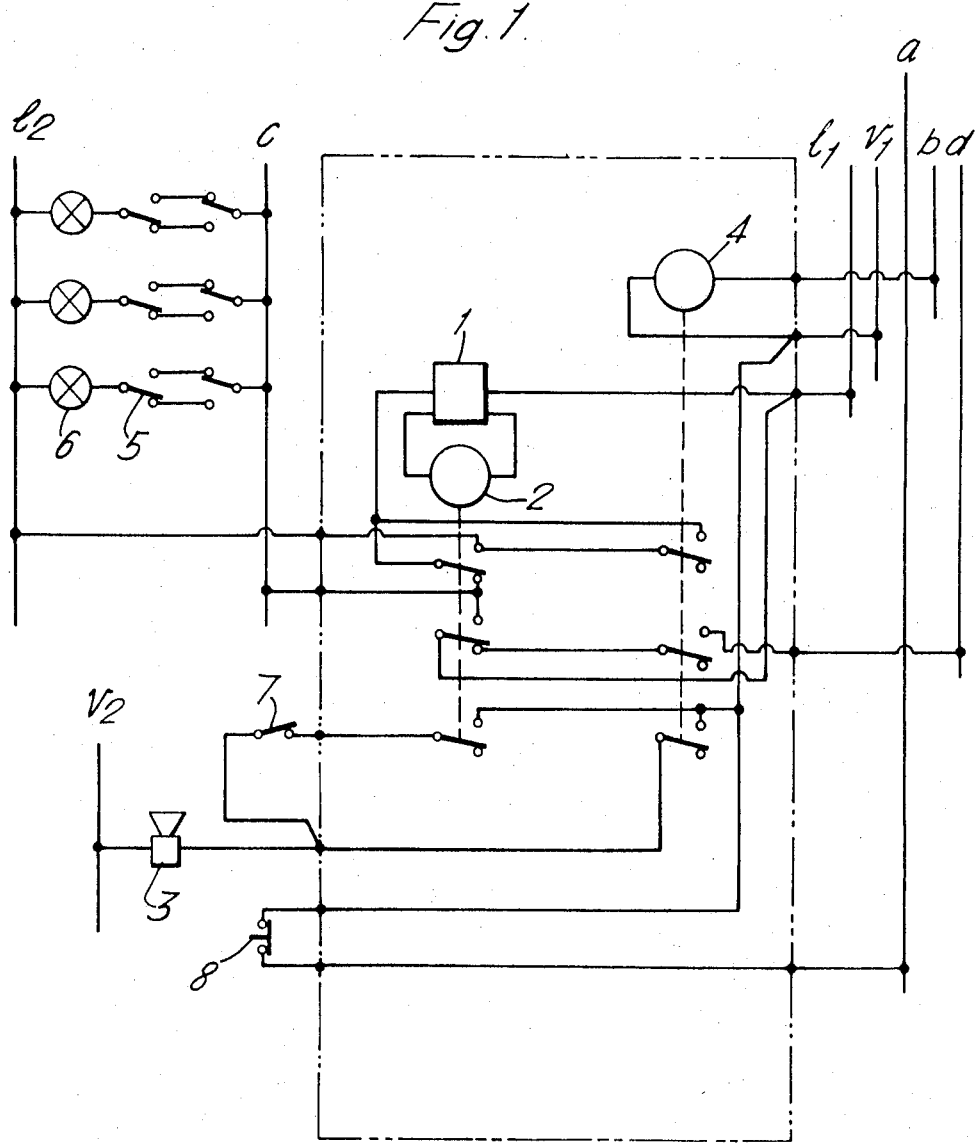
FIG. 1 shows the electric circuit diagram of a unit of the first type which performs the signalling control functions common to a system.

The units in the particular embodiments described are constructed as follows:

The unit of the first type (see FIG. 1) combines in a limited space the members necessary for controlling the signalling operations common to the system. These members are combined with a connector, two five-contact relays and an electronic device of known type for the flashing of the lamps. The connector, whose terminals are shown in FIG. 1 on the dash-dotted line bounding the unit, enables the components of the unit to be connected to the supply lines $v_1$, $v_2$ and $l_1$, $l_2$, to the connecting lines $a$, $b$, $d$, to the units of type 2, and to a number of particular components including an acoustic warning device 3, a switch 7, an acknowledgement button 8 and, through the line $c$, buttons 5 of the turn and push type.

A relay 4, which is energized by the application of voltage to the line $b$ initiates the operation of the acoustic warning device 3 and of an electronic device 1. The latter energizes at short intervals the relay 2, which intermittently applies voltage to the line *d*, which results in the flashing of a lamp 10 (see FIG. 2), which locates the fault.

It is possible by means of the buttons 5 to control apparatus, for example motors and valves, belonging to a system and to check that their position coincides with a displayed position. If this is not the case, the relay 2 sets up intermittent acoustic and luminous signals with the aid of the warning device 3 and of one of the lamps 6. The switch 7 enables the acoustic signal to be eliminated during the operation of the buttons 5, while the flashing luminous signal associated with the operated buttons and the acoustic and blinking signals corresponding to defects due to other causes are maintained.

The unit of the second type (see FIG. 2), which is mechanically interchangeable with the preceding unit, includes electromechanical components which are capable of performing elementary fault signalling control operations. These components are composed of two five-contact relays 9 and 11, a four-position selector 12, a switch 16 and a connector. The selector 12, which is a novel device, has a base provided with three parallel and equidistant rows of sockets and a slider of square cross section provided with three parallel rows of three equidistant pins, some of which are electrically connected together (see FIG. 2). By rotation of the slider through a quarter of a turn there can be obtained, for these four different orientations, a different pattern of connection of the members of the unit, which are connected to the sockets of the base, and therefore to the apparatus performing a particular function.

Figure 2:
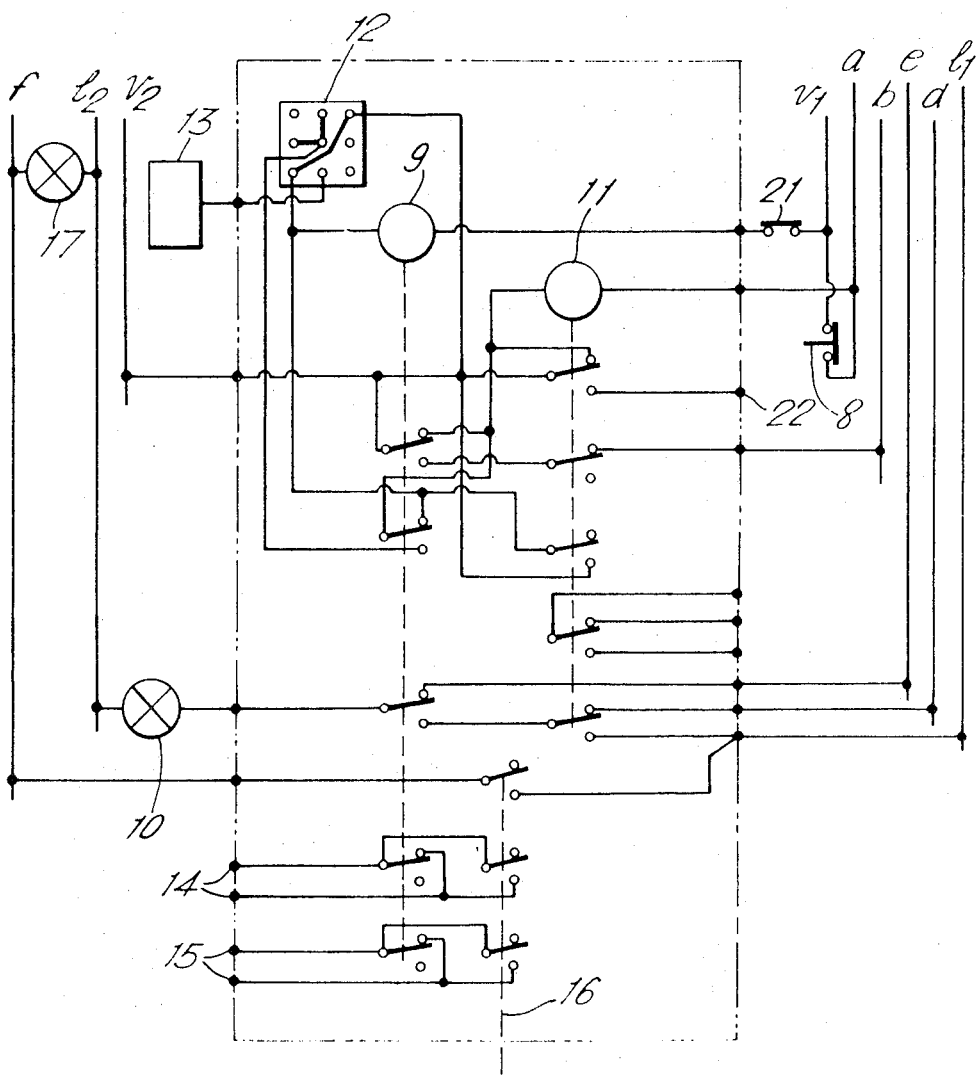
FIG. 2 shows the electric circuit diagram of a unit of the second type which performs the control of signalling peculiar to a fault.

The selector 12 is shown in FIG. 2 in the orientation 1, in which it signals a single fault. By turning it successively through a quarter of a turn in the clockwise direction and connecting the desired members to the sockets, it is possible either to store in an apparatus outside the unit a transitory fault (orientation 2) or to supply a signal which, with the aid of an external memory or storage device 13, distinguishes the first fault from a series of faults (orientation 3) or combines these two possibilities (orientation 4).

The unit of the second type enables the following operations to be performed:

Upon the occurrence of a fault detected by an external device 21, the relay 9 applies voltage to the lines *b* and *d*, which voltage is thereby applied to the unit of type 1. The latter operates the acoustic warning device 3 and causes the lamp 10 to flash. An acknowledgement of these signals is given with the aid of the relay 11 which, by acting on the button 8 stops the acoustic signal and the flashing of the luminous signal. The alarm ceases immediately a simple fault disappears.

When a fault occurs, the relay 9 opens the electric circuits indicated at 14 and 15, which permits the controlling of one or more devices, which operate in response to the existence of the said fault, either directly or indirectly, for example through followup control units of type 3. The switch 16 permits the cutting out of the action of the relays 9 and 11, so that it is possible, if necessary, to replace these relays without any interruption of service. This abnormal position of the switch may advantageously be signalled by a lamp 17.

The third type of unit (see FIG. 3), which is mechanically interchangeable with the previously described units, has the same but differently connected components as the unit of the second type. This unit can bring about the stopping or the starting of apparatus operating in response to the existence of a fault and affords the following possibilities:

Each unit of the third type is connected to one of the circuits indicated at 14 and 15 monitored by one or more units of the second type. In the event of a fault, one of them opens the circuits 14 and 15 which are arranged to interrupt the power feed to a relay 18, the release of which in turn opens the circuits connected to connections 19 and 20, to which are connected the devices which operate in response to the existence of this fault.

It may be necessary to cancel out this followup order, i.e. to keep the action of the relay 18 locked. This is possible after the acknowledgement of the fault signal which results in the closing of a circuit 22 diagrammatically illustrated in FIGS. 2 and 3. It is sufficient to actuate a lock button 23 in order to energize a relay 24, which closes the circuits connected to 19 and 20 and signals the locking action by means of a pilot light 25, which may be common to a number of units of like type.

Figure 3:
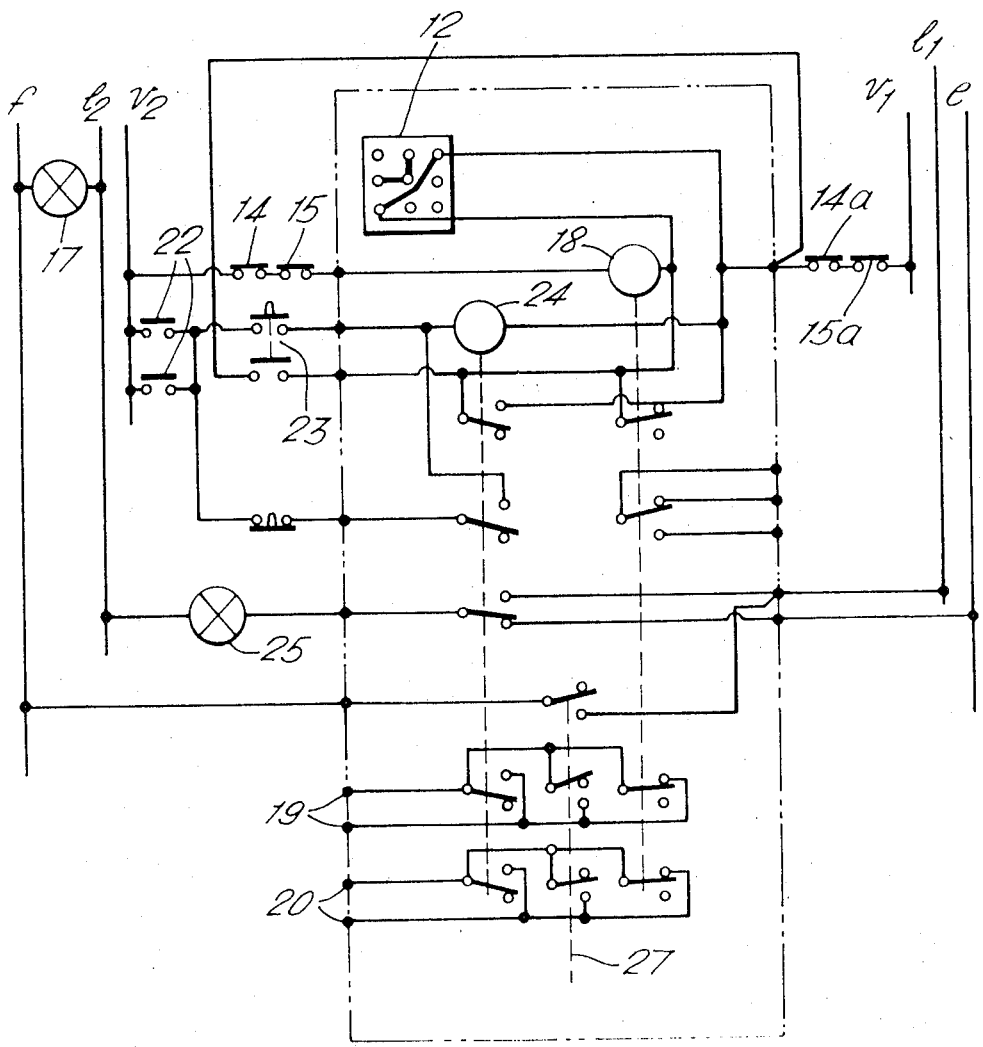
FIG. 3 shows the electric circuit diagram of a unit of the third type for the control of followup action.
Figure 4:
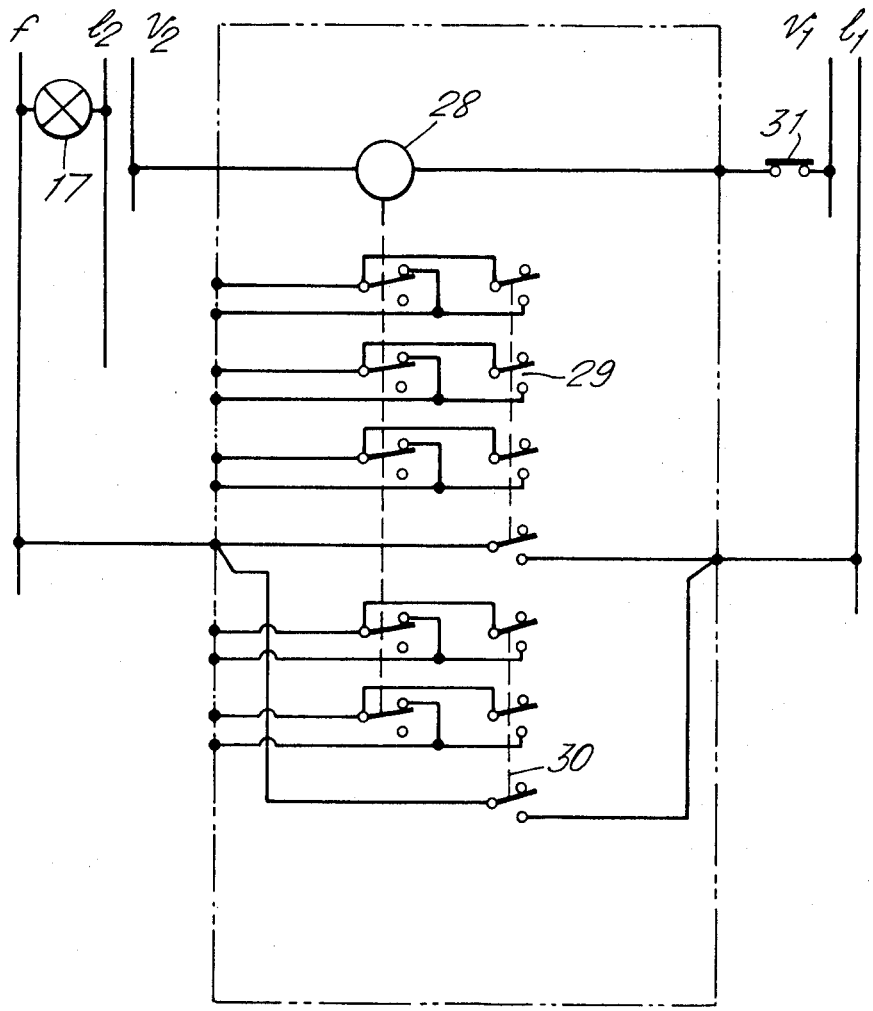
FIG. 4 shows the electric circuit diagram of a unit of the fourth type for signal repetition.

It may alternatively be necessary to prevent any possibility of locking the action of the relay. This condition is satisfied by connecting the unit of type 3 to the unit of type 2 by one of the circuits represented by 14*a* and 15*a*, if the connections are as illustrated in the diagram of FIG. 3.

The return to normal conditions is possible only when the fault has disappeared. This return is possible, and even automatic, if the selector 12 is brought into the orientation 2 or 4, except by voluntary action, i.e. by resetting of the relay 18 by means of the button 23.

A failure switch 27 permits the momentary maintenance of control of the devices connected to the connections 19 and 20 during the replacement of a relay 18 or 24. This exceptional situation may be signalled by the signalled by the lamp 17.

The repeating unit of the fourth type, which is mechanically interchangeable with the preceding units, has electromechanical members including a five-contact relay 28, a connector and two failure switches 29 and 30. It receives the signals emitted by devices such as 31, which consist of fault signalling control units or of followup control units, or of any other devices, and it can transmit these signals to other like units or to slave members and thus simultaneously control a number of a fault signalling and followup operation.

The electrical, electromechanical and electronic components of the various types of units defined in the foregoing are combined in casings which may be fixedly mounted on frames in a metal cabinet. In order to permit interchangeability of units of different types on one frame, the internal connections of the units are so effected and the low and very-low voltage lines are so disposed in the frames that each line is connected to the various units through pins of like order. The electromechanical or electronic components are combined within and on the front face of casings of reduced and standardized dimensions, while the rear face of the latter comprises a detachable connection plate and quick-acting fixing means, on a frame corresponding to the appropriate standards.

Figure 5:
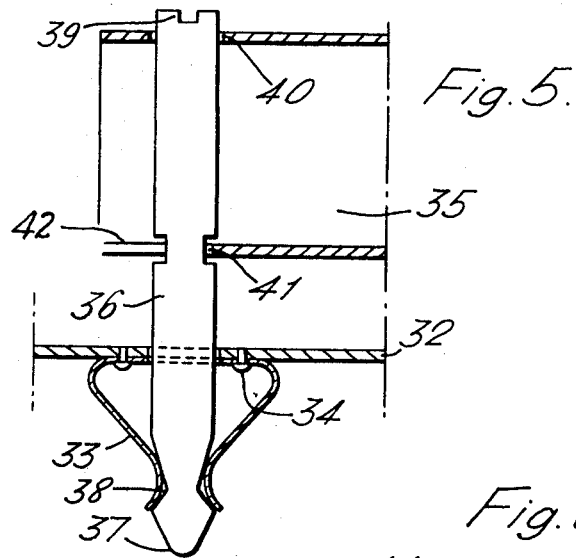
FIGS. 5 and 6 show sectional view of constructional details of a unit casing.
Figure 6:
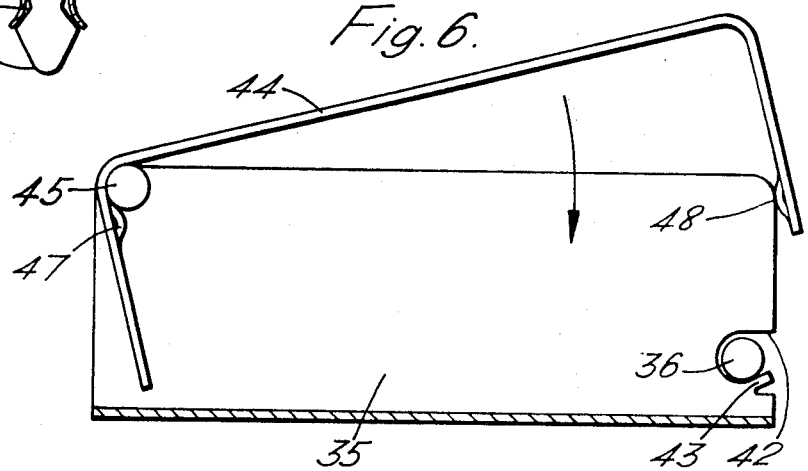

Referring to FIGS. 5 and 6 there is shown a frame 32 which has a face formed with two slightly offset parallel rows of holes. These holes, which are formed without any particular precision, are provided with a pair of spring blades 33 secured to the frame by screws 34, the ends of said spring blades bearing one against the other. Each casing 35 of a unit is provided with two identical cylindrical fixing rods 36 which are offset so as to enable the frame to be mounted in only one position, having regard to the position of the connector. That end 37 of the rod which is on the frame side is rounded and formed with two opposite recesses 38 which enable it to be locked on the frame or to be released after rotation through a quarter of a turn. The other end is provided with means of rotation, for example a groove 39 for a screwdriver. Each fixing rod is held in position by the front and rear faces of a casing. The rod is disposed on the one hand in a hole 40 and on the other hand, at the level of a groove 41, in a slot 42 (see FIG. 6), of which one side 43 is notched and slightly twisted to retain the rod after it has been placed in position. Each unit may be instantly fixed on the frame without the aid of tools, simply by engaging the two fixing rods in the corresponding holes in the frame and then exerting a pressure on the front face of the unit so as to overcome the thrust of the two ends of the spring blade 33. The latter move apart and then suddenly return to the level of the recesses, thus locking the unit on the frame. A unit is extracted just as rapidly after rotation of the fixing rods through a quarter of a turn by means of a screwdriver.

The units are of small but standard dimensions. The parts necessary for their construction have been reduced to a small number. The body of the casing, the cover, the fixing means, the connecting means, which includes a 16-contact connection strip, the internal connecting wires, which are all of like section and of the same length, the selector device, the means for fixing the relays and the relays themselves are all standardized. The nature and number of the electromechanical members and their connections merely differ in accordance with the type of unit. The various types of units may with advantage be distinguished by coloring, for example by anodic oxidation of aluminum casings.

The casing, which has the form of a rectangular parallelepiped, is closed by a resilient cover 44 illustrated in FIG. 6. The cover 44, which is preferably of metal, consists of an imperforate smooth plate of appropriate thickness, which is bent into the form of a U having three external faces. It is fitted on to the base of the casing, which also consists of a U-shaped smooth metal plate of similar length forming the three other faces of the casing. Thus, the cover is readily positioned. In addition to the two quick-acting securing pins there are provided on the rear face of the casing a 16-contact connection strip (not shown). It is also arranged that the electromechanical members within the casing are accessible from the front face of the casing.

A lateral face of the cover bears against the base of a fixing rod 45 retained against it by an eye 47, which may be formed by pressing, while the other face, which is provided with an identical eye 48 at its end, moves slightly away from the cover as a result of the resilient deformation when it is pushed manually home, so that the eye 48 slides on the rounded surface of the fixing rod 36, and then suddenly becomes locked behind it, the cover then abutting the casing. The cover can be rapidly opened by means of a screwdriver engaged between the cover and the casing.

Each unit is provided with a plate carrying a male connector arranged to engage in a female connector fixed to the frame. The plate carrying the connections may be screwed on to the face of the casing opposite the support frame. This face is previously recessed laterally so that the plate carrying the connections may be positioned or separated from the unit at any time, even if the connections to the various electromechanical members of the unit have already been made. In addition, the relays are connected through standard frames which are secured on the support casing after the connections have been made.

The casings and covers may be made of metal or of any material which is sufficiently robust and resilient, for example plastics materials. The electromechanical or electronic components are of small overall dimensions and may with advantage be in miniaturized form. There may be mounted on each unit one or more connectors preferably having male plugs. There may be provided on each unit devices indicating whether the unit is under voltage, function selecting means of various types, or changeover switches of any known lever or rotatable type.

Such units may also be employed in all systems comprising electric relays and automatic control means.

The four types of units which have been defined constitute means for carrying out the method of the invention. The above-described units which are employed, are, on the one hand, sufficiently elaborate to perform all the functions necessary for resolving the frequently complex problems of controlling both the signalling of faults and the operation of the followup systems which are encountered in industry, and, on the other hand, sufficiently simple to be used with advantage for the resolution of elementary problems. It would not be advantageous for performing all of the functions which have been defined to employ less than four different types of units, because it would be necessary to increase either the number of units or their complexity.

In accordance with the invention, a number of the above-described units chosen from at least two of the four types which have been defined are connected together for resolving problems of controlling the signalling of faults and controlling the followup operations.

In a system to be supervised, any fault, i.e. any parameter which exceeds a set limit is signalled by a detecting member to a unit of the second type, which transmits this signal to a unit of the first type, which initiates the acoustic and luminous signals, which are often transmitted to a signalling panel. One or more followup systems may be operated either directly by this same unit of the second type, without the possibility of locking or resetting. It is thus possible to provide a number of units of the second type in association with a unit of the first type. At least two types of the previously described units are thus connected together to form a system. However, it is often necessary to resolve more complex problems. For example, if it is desired to lock or reset a followup system, use must be made of one or more units of the third type. Likewise, if it is necessary to control a large number of followup systems, for example, it may be advantageous to employ repeating units of the fourth type. The selectors with which the units of the second and third types are provided are situated in positions corresponding to the desired forms of signalling and followup actions.

The present invention may be more readily understood from the following description made with reference to an example serving to illustrate it without limiting it, and employing a gas compressor provided with a system for the control of fault signalling and followup actions.

Figure 7:
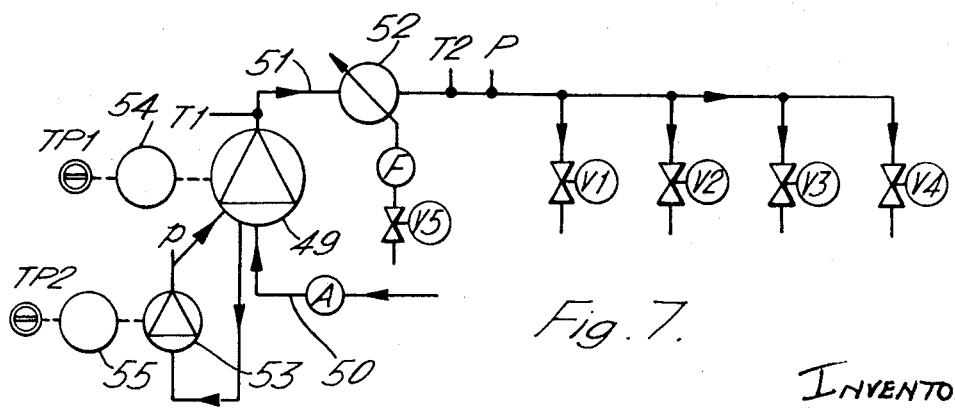
FIG. 7 shows diagrammatically a compressor installation.

Referring to FIG. 7 which diagrammatically illustrates the installation of the compressor, there is shown a compressor 49 provided with a gas intake pipe 50 which has a device A for analyzing the composition of the gas, and with a delivery pipe 51 provided with a probe indicating the temperature T1 of the gases at the delivery. The compressed gases are thereafter cooled in an exchanger 52 traversed by a flow of water F controlled by the valve V5; the temperature T2 of the gases at the outlet of the exchanger is measured by a probe and a manometer measures their pressure P. The gas can be distributed in four circuits controlled by the valves V1, V2, V3 and V4. The compressor 49 is lubricated by the circulation of oil placed under pressure $p$ by the pump 53. The motor 54 driving the compressor 49 and the motor 55 driving the pump 53 are started and stopped by means of turn and push buttons TP1 and TP2.

The following various requirements must be satisfied: the gas circuit controlled by the valve V1 must be employed only if the composition of the gas is correct; it must not be possible for the valve V1 to be involuntarily opened when the composition is incorrect. The circuits controlled by the valves V2 and V3 are employed when the composition of the gases is correct, but it must be possible for the valves V2 and V3, which close automatically if the composition of the gases is wrong, to be maintained open by way of exception in the case of necessity. The circuit controlled by the valve V4 must be employed regardless of the composition of the gas.

The stopping of the compressor must be automatically initiated in one of the following cases:
  a. the temperature T1 of the gases at deliver exceeds the fixed maximum temperature;
  b. the temperature T2 of the cooled gases exceeds the fixed maximum temperature;
  c. the pressure P of the gases exceeds the fixed maximum pressure P'';
  d. the rate of flow of the water F is lower than the fixed minimum rate;
  e. the oil pressure $p$ is below the fixed minimum pressure.

Stopping of the compressor must automatically result in stopping of the oil pump and closing of the valve V5, together with closing of the valves V1, V2, V3 and V4. It must be possible to cancel out the first two conditions by an appropriate locking device during the time necessary for the starting of the compressor.

An alarm must indicate that the pressure of the gases at the delivery of the compressor reaches an abnormally high value P' lower than P''. At the starting of the compressor, the valve V4 must automatically open.

The signalling and followup control functions which must be performed are specified and tabulated in the following table:

| Fault (location (type | Motor 54 1st fault | Temperatures of the gases T1 1st fault | T2 1st fault | Pressure of the gases P' single fault | P'' 1st fault + transitory fault | Oil Pressure P 1st fault + transitory fault | Water flow rate F transitory fault + 1st fault | Analyser A single fault |
|---|---|---|---|---|---|---|---|---|
| Orientation selector 12 | 3 | 3 | 3 | 1 | 4 | 4 | 4 | |
| Follow-up to be performed | | | | | | | | |
| Motor 54 | | NV | NV | | NV | NV | NV | |
| Motor 55 | V | | | | | | | |
| V1 | NV | | | | | | | |
| V2 | NV | | | | | | | reset-ting |
| V3 | NV | | | | | | | V |
| V4 | NV | | | | | | | V |
| V5 | V | | | | | | | |

V = locking
NV = non-locking

The fault signalling and subsequent followup controls are performed with the aid of units of the four types whose construction and functions have hereinbefore been explained. These units are provided with commercially obtainable members which are supplied with alternating current at 50 c./s. and at very low voltage, i.e. 127 volts for the relays and 24 volts for the lamps. These units are arranged side-by-side on frames in a metal cabinet in which they each occupy only a surface of 55×170 mm., the height of the casing being 45 mm., and that of the unit provided with relays 145 mm.

Figure 8:
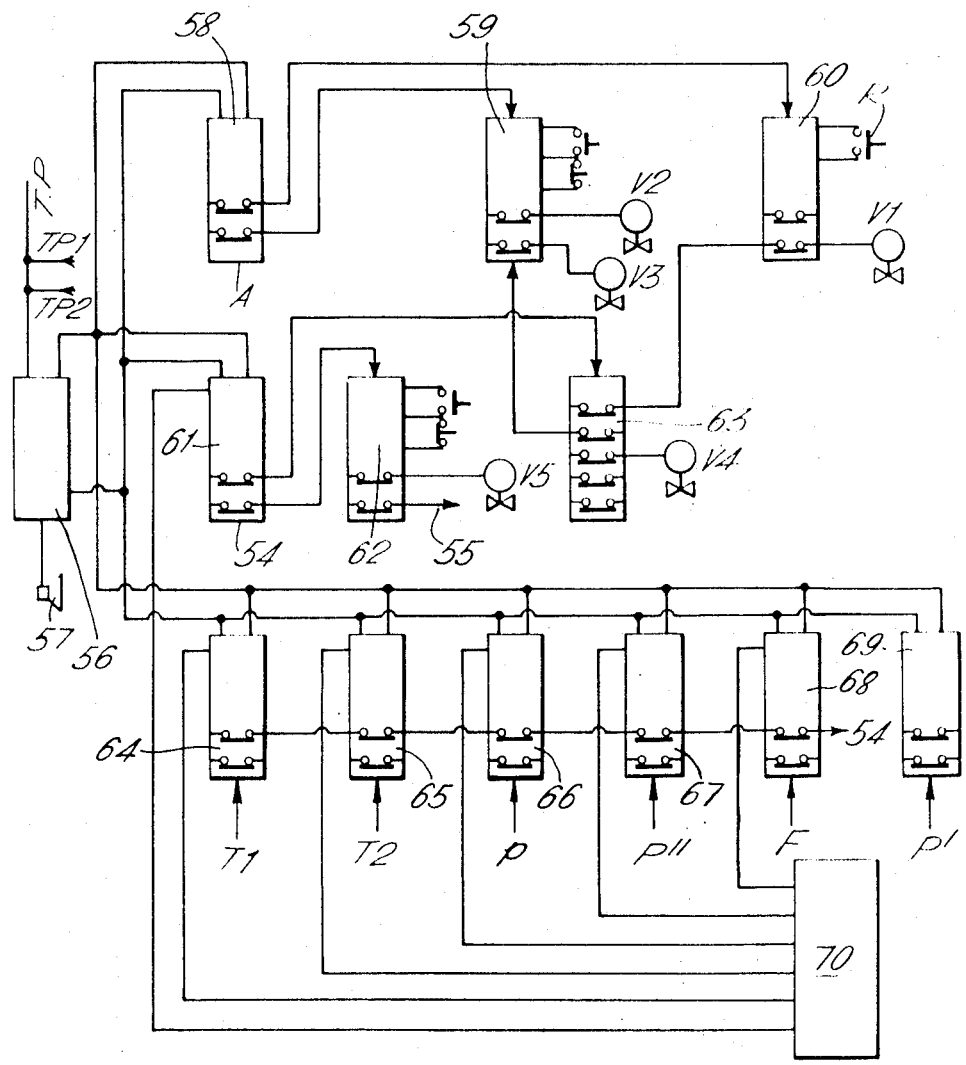
FIG. 8 shows a schematic circuit diagram of a system for use with the installation of FIG. 7.

In order to satisfy the various necessary conditions, there are connected in accordance with the circuit diagram shown in FIG. 8: on unit of type 1, referenced 56
  eight units of type 2, referenced 58, 61, 64, 65, 66, 67, 68, 69
  three units of type 3, referenced 59, 60, 62, and
  one unit of type 4, referenced 63
i.e. 13 units, together with one memory device 70.

For the sake of simplicity, only the lines for performing the most characteristic functions of each unit have been shown in this diagram.

When a fault is signalled to one of the units of the second type, the latter acts on the unit of the first type, which controls the signalling of the fault, and where necessary acts on a device, either directly or through a unit of the third type or the the fourth type.

Thus, the unit 56 of the first type performs the common functions of controlling the flashing of the signalling lamps, the acoustic signal from a transducer 57 and the signalling of the buttons TP1 and TP2 by the lamps 6. A gas analyzer A emits a fault signal received by the unit 58 of the second type, which is provided with a selector 12 arranged in accordance with the orientation 1. On the one hand, the unit 58 sends a signal to the unit 56, which initiates the acoustic and luminous signalling, and on the other hand it acts on the followup control units 59 and 60. The unit 59, which is provided with a selector in accordance with the orientation 1, is actuated in accordance with its lockable input and effects the lockable closing of the valves V2 and V3. The unit 60, which is provided with a selector 12 arranged in accordance with the orientation 2, is actuated in accordance with its nonlockable input and brings about the closing of the valve V1, which can be reopened only after action on the resetting switch R. The valve V4 remains open.

The unit 61 of the second type which is proved with a selector 12 arranged in accordance with the orientation 3, receives the signal for stopping the motor 54 by which the compressor is driven, and it supplies a signal to the memory device 70, which permits the location of a first fault. The unit 61 acts on the unit 56, which sets up the acoustic and luminous signals and simultaneously acts on the repeating unit 63 of the fourth type. The unit 62, which is provided with a selector 12 arranged in accordance with the orientation 1, is actuated in accordance with its lockable input and brings about the closing of the valve V5 and the stopping of the motor 55, which actions may be locked. The repeating unit 63 directly effects the closing of the valve V4 and indirectly effects, in nonlockable manner, the closing of the valves V1 via the unit 60 and V2 and V3 via the unit 59.

The units of the second type numbered 64 to 69 each receive a signal due to a fault of different nature, and they act on the unit 56, which sets up the acoustic and luminous signalling. Thus, the unit 69, which is provided with a selector in accordance with the orientation 1, signals an abnormally high pressure P' of the gases at the delivery from the compressor. When it receives a fault signal, each unit numbered from 64 to 68 directly stops the motor of the compressor 54 and supplies a signal which is stored by the memory device 70, which permits the location of a first fault. Each selector 12 is disposed in accordance with the orientation 3 for the units 64 and 65 and in accordance with the orientation 4 for the units 66, 67 and 68, because the latter also detect a transitory fault.

Thus, each unit of the second type indicates, in accordance with the requirements, a single fault, a first fault and/or a transitory fault; each unit of the third type includes, in accordance with the requirements, means for optionally locking a followup, or for resetting the followup control relay when the fault has disappeared.

Any modification of the data of this problem can be rapidly met by modifying the connections outside the unit, or the orientation of the selector provided in the units of the second and third types, or again the number of units of the second, third and fourth types.

In the event of a component being defective, either the unit may be cut out during the replacement of the defective component, or the unit may be immediately replaced.

This example illustrates, in a particular case, the procedure adopted in accordance with the invention for meeting the various requirements of the problem of controlling fault signalling and followup control. It will be seen that, in order to resolve this problem, and any other problems of this nature, the list of all the functions required is prepared by combining all those which are concerned with a common fault or a common followup procedure, whereafter the units necessary for performing one or more of the functions thus established are chosen. Thus, up to four different types of units, such as those previously described, are connected together, and as many units are employed as are necessary for satisfying all the requirements of the problem.

More generally speaking, the invention is related to any method of controlling fault and followup signalling which consists in connecting together the desired number of units chosen from the four different types of mechanically interchangeable units, which are provided with the aforesaid electromechanical and electronic components which perform the previously explained functions.

Arrangements in accordance with the invention may be employed to resolve many industrial problems involving fault signalling and followup control, no matter how complex. It is sufficient to break down the various requirements into operations of controlling common signalling, fault signalling, followup operations and signal repetition and to employ the appropriate number of corresponding units.

Within the scope of the present invention, the described units may employ relays having a negative action, e.e. relays which are deenergized in normal operation, or having one of the contacts which is a make contact and the other a break contact, or having both contacts as make contacts. The number of contacts in the relays employed may vary in accordance with requirements.

The power supply to the units may be alternating current or direct current. It is also possible to initiate either a continuous or an intermittent acoustic and luminous signalling in any form considered desirable. For small assemblies, it may be advantageous to employ the same voltage for the signalling lamps and to the relays.

In accordance with the invention, any multiposition selector may be employed to enable the same unit to perform simultaneously one or more functions chosen from a range of possible functions. It is also possible to employ at each unit a failure switch for permanently placing it out of circuit, and in addition to provide a means for indicating that the voltage has been removed therefrom.

The units according to the invention are of simple construction and lend themselves to extensive standardization They are interchangeable and their components can be readily exchanged. They perform functions which can be readily modified in accordance with requirements.

The method of the invention may be equally well applied to the control of safety members and to the monitoring of industrial installations in the chemical and petrochemical industries, and to the monitoring of transfer machines in the mechanical industry, or to the monitoring of apparatus and even of industrial units in the most varied industries.

We claim:

1. An electrical control system for signalling faults in, and for controlling the followup action of, an industrial process, the electrical control system comprising, in combination:
   a. at least two mechanically interchangeable units, one of said units performing signal control functions of the system, and at least one unit of a second type for signalling the occurrence of a particular fault to said one unit and for controlling one or more followup systems;
   b. a warning device controlled by said one unit; and
   c. a signalling device associated with each unit of said second type which is controlled by said one unit.

2. An electrical control system as claimed in claim 1, further comprising at least one unit of a third type which is mechanically interchangeable with said one unit and with each unit of said second type, said third type of unit incorporating a locking facility, and in which, in use, each third type of unit is interconnected electrically between one unit of said second type and at least one followup system for ensuring the desired control of the or each followup system in response to a fault being signalled by the unit of said second type.

3. An electrical control system as claimed in claim 2, further comprising at least one-fourth type of unit for carrying out signal repetition in response to a signal from, on the one hand, said second type of unit, and, on the other hand, said third type of unit, and in which said fourth type of unit is mechanically interchangeable with any of said one, said second and said third types of unit.

4. An electrical control system as claimed in claim 3, in which each unit includes a casing, a cover for the casing, which is secured in position by pressure, a front and a rear face to the casing, two quick-acting securing pins and an electrical connector mounted on said rear face, and electromechanical members which are accessible from said front face.

5. An electrical control system as claimed in claim 3, in which said signalling device is a lamp and in which said one unit comprises first and second five contact relays, a lamp flasher unit and an electrical connector, in which said first relay is connected to be energized on the occurrence of a fault signalled by said first relay of said second unit, said second relay is connected to be energized by the lamp flasher unit which in turn is energized by the actuation of a set of contacts of said first relay, another set of first relay contacts arranged to control the energization of said warning device and a further set of first relay contacts for controlling the energization of said lamp associated with a respective unit of the second type; and in which one set of said second relay contacts is associated with said further set of said first relay contacts so that said lamp can be flashed on and off and another set of said second relay contacts is connected into a circuit for switching off the warning device.

6. An electrical control system as claimed in claim 5, in which each unit of the second type comprises first and second five contact relays and an electrical connector, in which one side of a coil of said first relay is connectable through said connector to a device to be monitored, the other side of said first relay is connectable through said connector to a relay voltage bus; in which a first set of contacts of said first relay is connected in a circuit which signals the occurrence of a fault to said one unit; in which a second set of contacts to said first relay is connected through said connector to said lamp, and at least one set of control contacts is connectable in a circuit for controlling the followup action of the industrial process; and in which said second relay is deenergizable by acting on an acknowledgement button, a first set of contacts of the second relay is connected in said indicating lamp circuit and serves to switch the lamp from said flasher unit to a steady lamp voltage bus; and a second set of contacts of said second relay which are switchable upon the deenergization of said second relay to interrupt said fault signalling circuit to said one unit.

7. An electrical control system as claimed in claim 6, in which each unit of the third type comprises first and second five contact relays and an electrical connector; in which said first relay is connectable in a circuit including said control contacts of said first relay of said second unit and a voltage supply bus, at least one set of contacts of said first relay of said third unit is connectable to operate an external device in response to the occurrence of a fault signal by a unit of the second type; and in which said second relay is connected in an override circuit, a first set of contacts of said second relay is connected in parallel with said at least one set of contacts of said first relay, and another set of contacts of said second relay is connectable to a pilot light which is energized through the actuation of said another set of contacts to indicate that said second relay has been energized.

8. An electrical control system as claimed in claim 7, in which each unit of the fourth type comprises a five contact relay and an electrical connector; and in which said relay is connectable through said connector into a circuit comprising a voltage supply bus on the one hand and on the other hand, on one occasion, control contacts of the first relay of said second unit and, on a different occasion to said at least one set of contacts of said first relay of said third unit, and sets of contacts of said relay are connectable to slave members to be controlled in accordance with the energization of said relay.

9. An electrical control system as claimed in claim 8, further comprising a switch provided in each of said units of said second, third and fourth types, and in which each of said switches is switchable to bypass those relay contacts of each of said types of units which are used to control a part of said industrial process thereby enabling the said part to be maintained operative when a relay is removed from one of said second, third and fourth type of units.

10. An electrical control system as claimed in claim 7, further comprising a four-position selector device in each unit of the second and third types, in which said selector device enables the internal connections of said units to be changed so that the particular unit can fulfill at least two different functions.